United States Patent
Goto et al.

(10) Patent No.: US 9,100,378 B2
(45) Date of Patent: Aug. 4, 2015

(54) FILE TRANSFER DEVICE AND METHOD THEREFOR

(75) Inventors: Masataka Goto, Yokohama (JP);
Nobuhiko Sugasawa, Yokohama (JP);
Yuta Kobayashi, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 829 days.

(21) Appl. No.: 13/406,859

(22) Filed: Feb. 28, 2012

(65) Prior Publication Data
US 2013/0054733 A1 Feb. 28, 2013

(30) Foreign Application Priority Data
Aug. 26, 2011 (JP) ................................. 2011-185223

(51) Int. Cl.
G06F 15/167 (2006.01)
H04L 29/08 (2006.01)

(52) U.S. Cl.
CPC ............... H04L 67/06 (2013.01); H04L 67/04 (2013.01)

(58) Field of Classification Search
CPC .............................. H04L 67/04; H04L 67/06
See application file for complete search history.

(56) References Cited

U.S. PATENT DOCUMENTS

| 6,298,407 | B1* | 10/2001 | Davis et al. | 710/314 |
| 7,512,311 | B2* | 3/2009 | Kaku | 386/353 |
| 2005/0138091 | A1* | 6/2005 | Bono | 707/205 |
| 2008/0195831 | A1* | 8/2008 | Tsukamoto et al. | 711/167 |

FOREIGN PATENT DOCUMENTS

JP 2011-009872 1/2011

* cited by examiner

*Primary Examiner* — Larry Donaghue
(74) *Attorney, Agent, or Firm* — Amin, Turocy & Watson, LLP

(57) ABSTRACT

There is provided a file transfer device in which a determining unit determines, when a first file requested by a user terminal is not cached in a file buffering unit, a second file transferred to the user terminal based on a file cache status of the file buffering unit, a transfer protocol unit reads the second file from the file buffering unit while the file buffering unit reads the first file, a transmitting unit transmits the second file to the user terminal, wherein the instructing unit determines to transfer the first file, based on a progress status of reading the first file, the transfer protocol unit suspends reading the second file and reads the first file from the file buffering unit, the transmitting unit transmits the first file read by the transfer protocol unit to the user terminal.

7 Claims, 15 Drawing Sheets

FILE TRANSFER REQUEST

| ITEM | EXAMPLE VALUE (VARIABLE EXPRESSION) |
|---|---|
| NAME OF TRANSFER REQUESTED FILE | FILE A ($reqFileName) |
| TRANSFER STARTING POSITION | 0 BYTE ($lseek) |

FIG. 7

TRANSFERRED FILE INFORMATION

| ITEM | EXAMPLE VALUE (VARIABLE EXPRESSION) |
|---|---|
| NAME OF TRANSFER REQUESTED FILE | FILE A ($reqFileSize) |
| SIZE OF TRANSFER REQUESTED FILE | 342683720 BYTES ($reqFSize) |
| NAME OF FILE BEING TRANSFERRED | FILE B ($tFileName) |
| SIZE OF FILE BEING TRANSFERRED | 87236740 BYTES ($tFileSize) |
| SIZE OF TRANSFERRED DATA IN FILE BEING TRANSFFERRED | 65536 BYTES ($tSendSize) |
| ELAPSED TRANSFER TIME FOR FILE BEING TRANSFERRED | 60 μsec ($tSendTime) |

FIG. 8

FILE CACHE STATUS

| FILE NAME ($cFileName[$cIndex]) | FILE SIZE ($cFileSize[$cIndex]) | CACHE SIZE ($cCacheSize[$cIndex]) |
|---|---|---|
| FILE B | 87236740 BYTES | 87236740 BYTES |
| FILE C | 65398221 BYTES | 65398221 BYTES |
| FILE D | 123276543 BYTES | 1048576 BYTES |

FIG. 9

REMAINING TIME FOR FILLING CACHE ≤ TIME REQUIRED FOR TRANSMITTING CACHE DATA → REQUEST RESPONSE INSTRUCYION

REMAINING TIME FOR FILLING CACHE > TIME REQUIRED FOR TRANSMITTING CACHE DATA → PUSU INSTRUCTION

REMAINING TIME FOR FILLING CACHE = (CURRENT TIME − \$startTime) $\frac{\$cFileSize["FILE\ A"] - \$cCacheSize["FILE\ A"]}{\$cCacheSize["FILE\ A"]}$ TIME REQUIRED FOR TRANSMITTING CACHE DATA = \$tSendTime $\frac{\$cCacheSize["FILE\ A"]}{\$tSendSize}$

FIG. 13

FILE TRANSFER REQUEST (WITH FILE LIST)

| ITEM | EXAMPLE VALUE (VARIABLE EXPRESSION) |
|---|---|
| NAME OF TRANSFER REQUESTED FILE | FILE A ($reqFileName) |
| TRANSFER STARTING POSITION | 0 BYTE ($lseek) |
| NAME OF DEPENDENT FILE REQUESTED TO BE TRANSFERRED [1] | FILE C |
| DEPENDENT TRANSFER STARTING POSITION [1] | 4096 BYTES |

FIG. 14

FILE TRANSFER REQUEST
(WITH FILE LIST INCLUDING REJECTION FILES)

| ITEM | EXAMPLE VALUE (VARIABLE EXPRESSION) |
|---|---|
| NAME OF TRANSFER REQUESTED FILE | FILE A ($reqFileName) |
| TRANSFER STARTING POSITION | 0 BYTE ($lseek) |
| NAME OF DEPENDENT FILE REQUESTED TO BE TRANSFERRED [1] | FILE C |
| DEPENDENT TRANSFER STARTING POSITION [1] | 4096 BYTES |
| NAME OF REJECTION FILE [1] | FILE B |
| NAME OF REJECTION FILE [2] | FILE D |

FIG. 15

FILE TRANSFER DEVICE AND METHOD THEREFOR

CROSS REFERENCE TO RELATED APPLICATIONS

This application is based upon and claims the benefit of priority from the prior Japanese Patent Application No. 2011-185223, filed on Aug. 26, 2011, the entire contents of which are incorporated herein by reference.

FIELD

An embodiment relates to a file transfer device and a file transfer method.

BACKGROUND

Proximity wireless communication is a communication method for transmitting and receiving data at high speed over distances of several centimeters to several tens of centimeters. Typical examples of proximity wireless communication methods include Transfer JET and NFC (Near Field Communication). One of the assumed services is file transfers, and there has been a suggested method of smoothly performing bidirectional file transfers.

One of the important applications of the proximity wireless communication is "touch communication." Two devices are brought close to (in touch with) each other for an extremely short period of time, so as to exchange files. In this case, only an extremely short period of communication time can be secured, and therefore, a file exchange method that effectively uses the limited time is needed.

However, in a case where a subject file to be transferred is held in a hard disk drive (HDD), a delay in accessing the HDD becomes a problem. That is, data is loaded into a memory after a waiting period for seeking, a waiting period for a data transfer, and waiting periods for interrupts by them. The data is then transferred through a proximity wireless interface. In this manner, a file transfer is performed.

If the touching time is one second, several tens of milliseconds to several hundreds of milliseconds are required for loading transmission data into a memory, with the waiting period from seeking of the HDD to the data transfer being taken into account. As a result, in the touching time of one second, the time that can be used for actual proximity wireless communication is greatly reduced.

Furthermore, in a case where the subject file to be transmitted is stored in a network storage for the transmission terminal, another delay occurs. That is, in a case where a network delay occurs in accessing a network HDD, the network delay in accessing the HDD is added to the above mentioned delay in accessing the HDD. Therefore, the time that can be used for actual proximity wireless communication becomes very short.

Particularly, in a use situation, for example, where touch communications are repeated in public places, the accumulation of time loss becomes large, and adversely affects the file transfer efficiency of the entire system.

BRIEF DESCRIPTION OF THE DRAWINGS

FIG. 7 shows an example of file transfer request information;
FIG. 8 shows an example of transferred file information;
FIG. 9 shows an example of file cache status information;
FIG. 13 is a diagram illustrating a method of calculating the remaining cache filling time and the time required for transmitting cached data;
FIG. 14 shows a modification of a file transfer request;
and
FIG. 15 shows another modification of a file transfer request.

DETAILED DESCRIPTION

There is provided a file transfer device comprising: a file buffering unit, a receiving unit, an instructing unit, a determining unit, a transfer protocol unit and a transmitting unit.

The file buffering unit reads a file from a storage storing files, and caches the file therein.

The receiving unit receives a request for a transfer of a first file from a user terminal.

The instructing unit instructs the file buffering unit to read the first file from the storage when the first file is not cached in the file buffering unit.

The determining unit determines a second file which transfers to the user terminal from the file cashed in the file buffering unit based on a file cache status of the file buffering unit when the first file is not cached in the file buffering unit.

The transfer protocol unit reads the second file from the file buffering unit while the file buffering unit reads the first file.

The transmitting unit transmits the second file unit to the user terminal.

The instructing unit determines to transfer the first file, based on a progress status of reading the first file into the file buffering unit.

The transfer protocol unit suspends reading the second file and reads the first file from the file buffering unit, when the instructing unit determines to transfer the first file.

The transmitting unit transmits the first file read by the transfer protocol unit to the user terminal.

Hereinafter, the embodiments will be explained with the accompanying drawings

Figure 1:
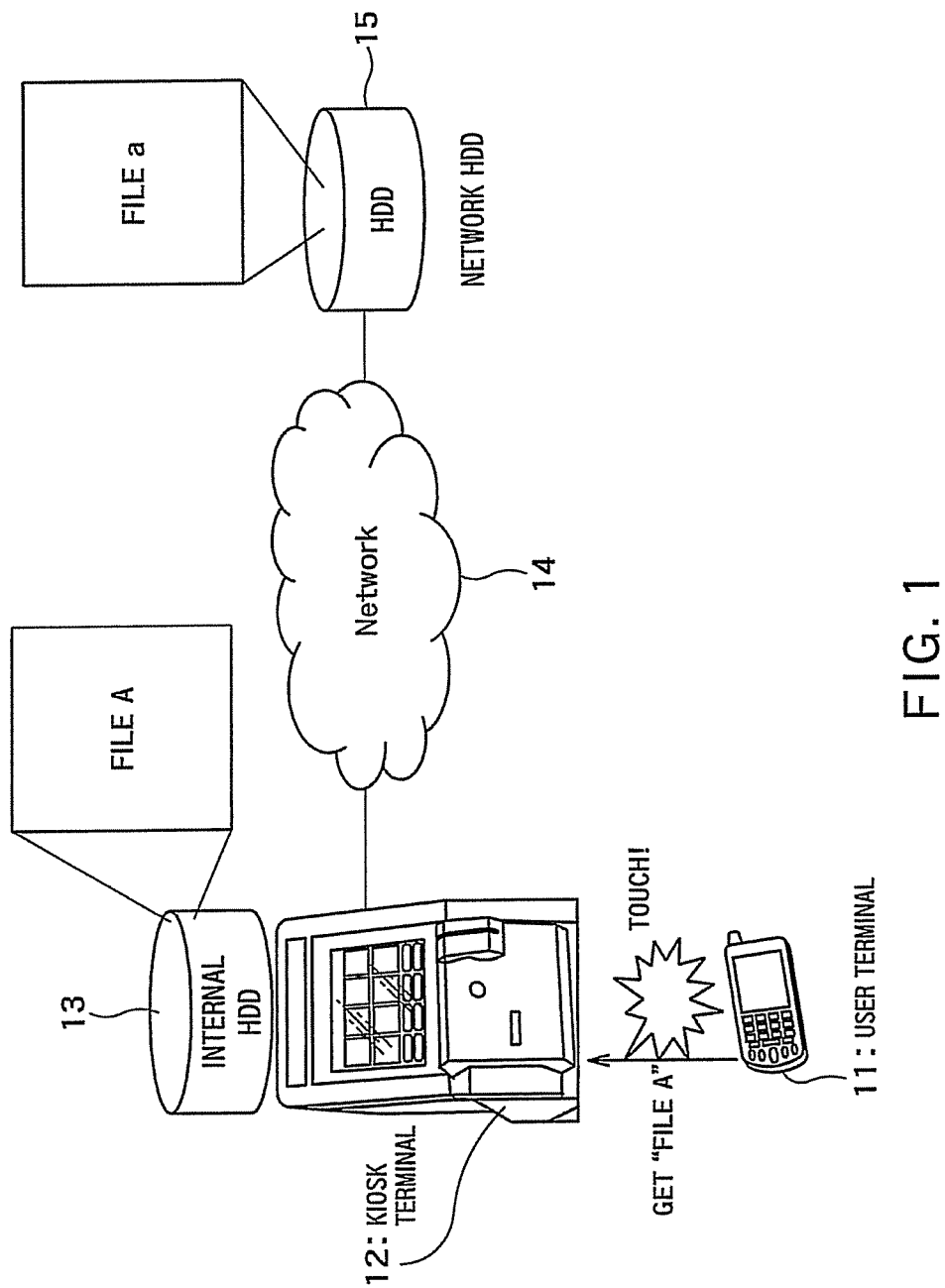
FIG. 1 is a diagram showing the outline of an entire system according to an embodiment.

FIG. 1 is a diagram for explaining the outline of an entire system according to an embodiment.

A user terminal 11 is a mobile terminal that is carried by a user. The user terminal 11 has a proximity wireless communication unit that executes a communication for scheme transmitting and receiving data at high speed over distances from several centimeters to several tens of centimeters. The user brings the user terminal 11 in "touch" with a stationary terminal (a kiosk terminal in this example) 12 serving as a file transfer device according to the embodiment. By doing so, the user receives data such as a file from the kiosk terminal 12. Through the touch with the user terminal 11, the kiosk terminal 12 transmits data such as a file to the user terminal 11. The kiosk terminal 12 includes an internal HDD (a storage) 13 for holding files. The kiosk terminal 12 is also connected to a network HDD (a storage) 15 holding files via a network 14.

The internal HDD 13 of the kiosk terminal 12 holds a file A, and the network HDD 15 holds a file a. In this example, when a proximity wireless communication is started by touching the kiosk terminal 12, the user terminal 11 issues an acquisition request for the file A (Get "file A"), and receives the file A from the kiosk terminal 12. The issuance of the acquisition request for the file A at the time of the touch is conducted by an operation performed beforehand by the user or an instruction from a program being executed in the user terminal 11.

Figure 2:
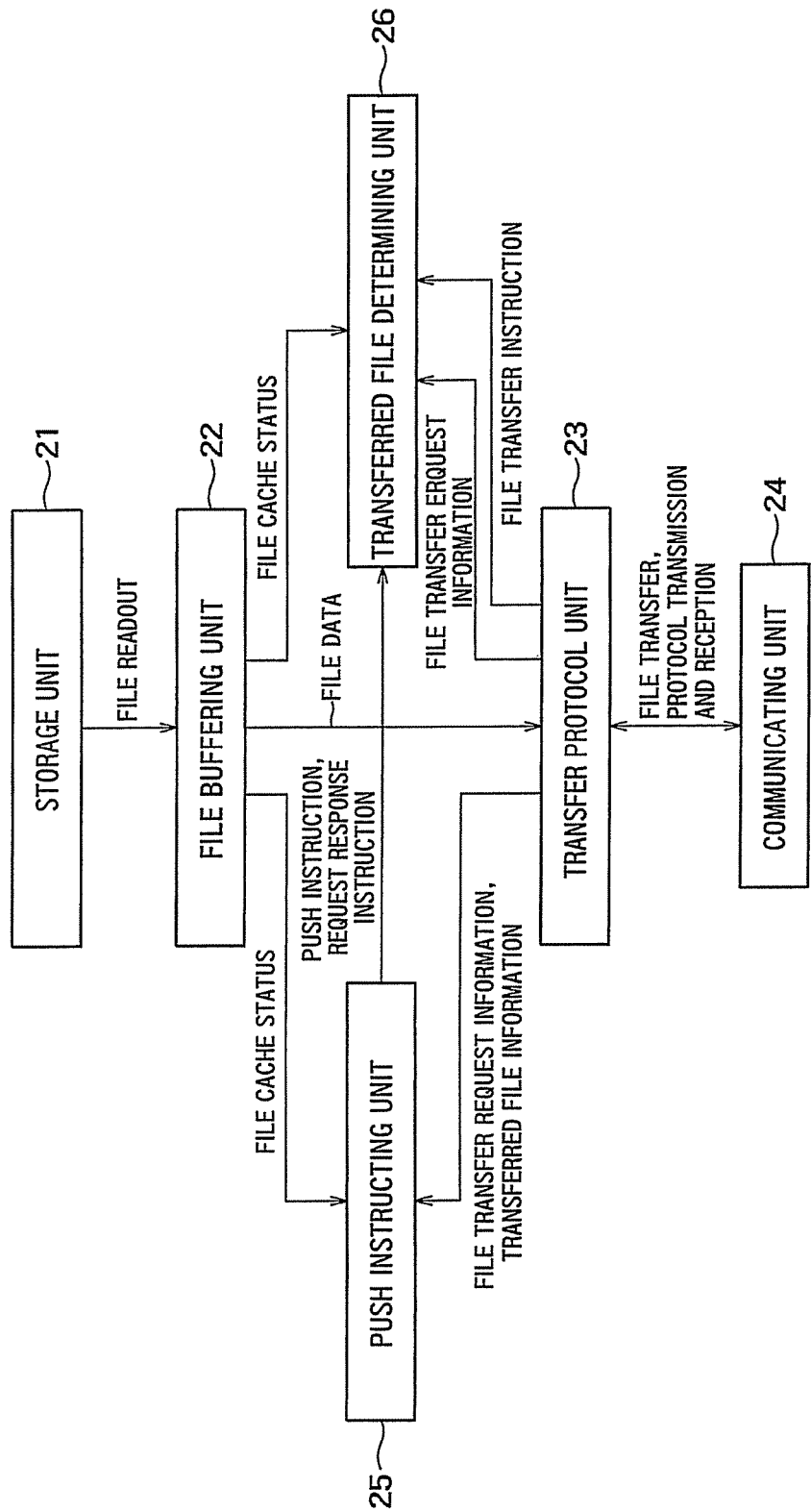
FIG. 2 is a functional block diagram of a kiosk terminal as a file transfer device according to the present embodiment.

FIG. 2 is a functional block diagram of the kiosk terminal 12 as the file transfer device according to the embodiment.

The kiosk terminal 12 includes a storage unit 21, a file buffering unit 22, a transfer protocol unit 23, and a communicating unit 24. The kiosk terminal 12 further includes a push instructing unit 25 and a transferred file determining unit 26 that characterize the present embodiment.

The storage unit 21 is an internal HDD (an internal storage) of this device or a network HDD (a network storage) connected to a network. The storage unit 21 holds files.

The file buffering unit 22 reads a file from the storage unit 21, and holds the read file therein (in a memory such as a RAM). The file buffering unit 22 is a functional block that increases the speed of file access to the storage unit 21.

The communicating unit (a receiving unit, a transmitting unit) 24 communicates with user terminals. In the present embodiment, the communicating unit 24 performs proximity wireless communications. However, the communicating unit 24 may perform communications other than proximity wireless communications. The communicating unit 24 preferably has a communication speed equal to or higher than the speed of data transfers from the storage unit 21.

The transfer protocol unit 23 is a protocol unit that performs file transfers to user terminals via the communicating unit 24. The transfer protocol unit 23 receives a file transfer request (a first file transfer request) from a user terminal via the communicating unit 24, and sends the information about the file transfer request to the push instructing unit 25 and the transferred file determining unit 26. The transfer protocol unit 23 reads the file designated by the transferred file determining unit 26 from the storage unit 21 via the file buffering unit 22. The transfer protocol unit 23 then transmits the read file to the user terminal via the communicating unit 24. However, if the file is already held in an internal memory of the file buffering unit 22, the transfer protocol unit 23 does not access the storage unit 21, but reads the file from the internal memory at high speed. The transfer protocol unit 23 also sequentially sends information about the file being transferred to the user terminal (transferred file information) to the push instructing unit 25.

The push instructing unit 25 receives the file transfer request and the transferred file information from the transfer protocol unit 23. The push instructing unit 25 determines whether the file designated by the file transfer request (a requested file) is to be transferred, or whether another file is to be transferred. Hereinafter, transmission of another file will be also referred to as "push" in the present embodiment. The requested file is equivalent to a first file.

When transmission of the file designated by the file transfer request is determined, a request response instruction is sent to the transferred file determining unit 26. When transmission of another file is determined, a push instruction is sent to the transferred file determining unit 26. It should be noted that the push instruction does not contain information as to which file is to be sent, and the transferred file determining unit 26 determines which file is to be sent.

The push instructing unit 25 determines whether to issue a request response instruction or whether to issue a push instruction, based on the following criteria: the cache status of the requested file held by the file buffering unit 22; the remaining time required to fill the cache of the requested file; and the time required for transferring cached data, with the transmission capacity of the transfer protocol unit 23 being taken into account.

When issuing a push instruction, the push instructing unit 25 waits for the right time to transmit the requested file, based on the above described criteria and then determines to transmit the requested file. After determining transmission of the requested file, the push instructing unit 25 sends a request response instruction to the transferred file determining unit 26.

The transferred file determining unit 26 receives a push instruction or a request response instruction from the push instructing unit 25. When receiving a push instruction, the transferred file determining unit 26 determines another file to be transferred to the user terminal (a second file), and instructs the transfer protocol unit 23 to transfer the determined file. When receiving a request response instruction, the transferred file determining unit 26 instructs the transfer protocol unit 23 to transmit the requested file (the first file). If the transferred file determining unit 26 receives a request response instruction during a transfer of another file, the transferred file determining unit 26 suspends the transfer of the other file, and instructs the transfer protocol unit 23 to transmit the requested file.

Figure 3:
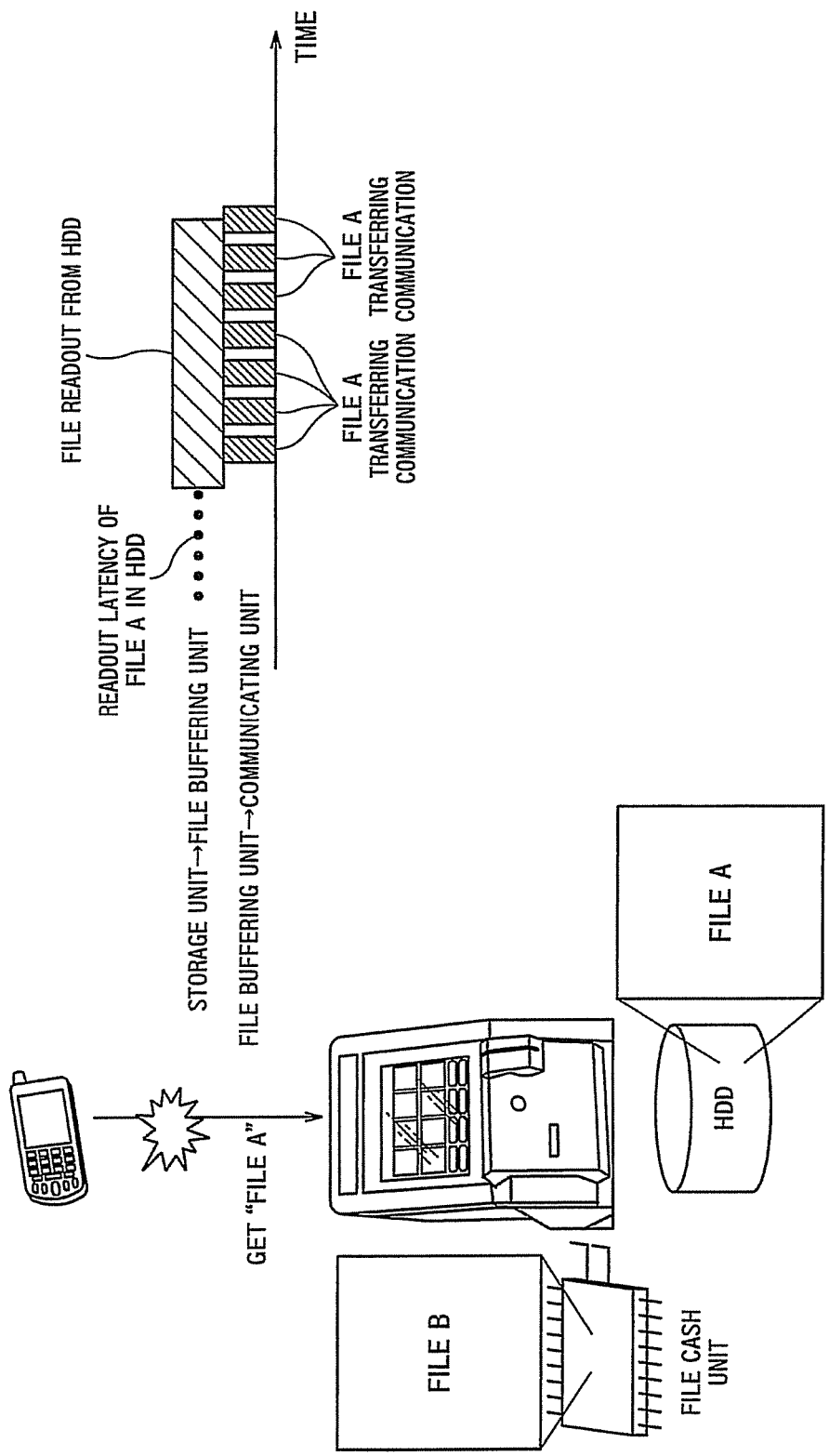
FIG. 3 is a diagram illustrating an example operation to be performed in a conventional system.
Figure 4:
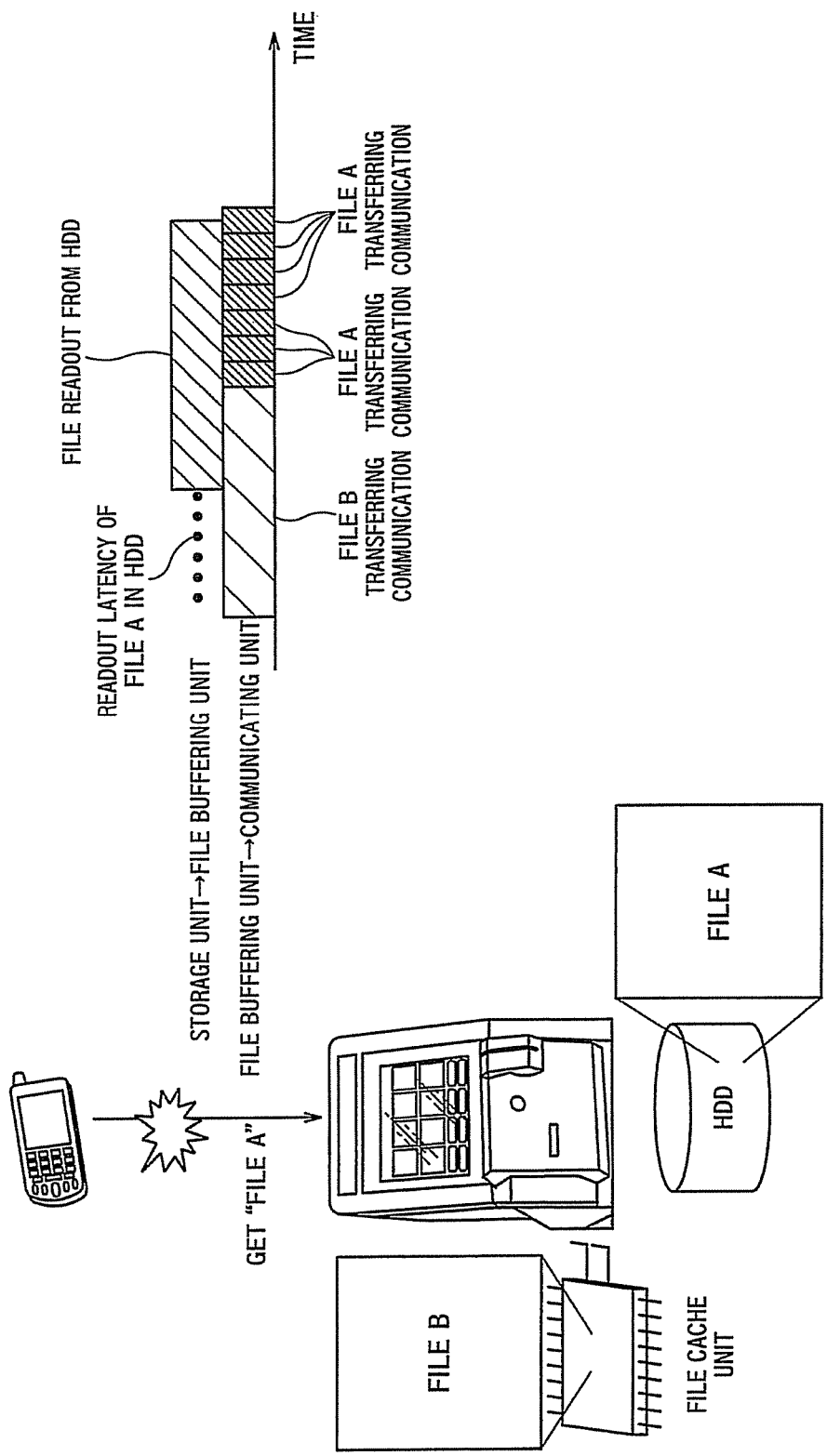
FIG. 4 is a diagram illustrating a typical example operation according to the present embodiment.

Referring now to FIGS. 3 and 4, typical examples of operations according to a conventional art and the present embodiment are described.

The file A is held in the HDD that is the storage unit 21, and a file B is held in the file buffering unit 22. The file B has been read out from the internal HDD or the network HDD that is the storage unit 21, and is held in the file buffering unit 22. When the file transfer device is touched with a user terminal to start a communication, the file transfer device (the kiosk terminal) receives "GET "file A"", which is a request for a transfer of the file A, from the user terminal.

In the conventional example illustrated in FIG. 3, a request for readout of the file A is issued from the file buffering unit to the storage unit, and the file buffering unit starts reading the file A. The transfer protocol unit sequentially transfers the file data read by the file buffering unit to a user terminal via the communicating unit. In reading data from the storage unit, there are the seek time of the HDD and a delay in the data transfer. Therefore, there is a latency period before the data of the file A actually starts being stored into the file buffering unit. The file data stored in the file buffering unit is sequentially transferred via the communicating unit. However, the transfer speed of the communicating unit is higher than the speed of readout from the storage unit. As a result, the communication becomes intermittent.

In the present embodiment, on the other hand, the readout latency and the time required for reading the file A (the requested file) into the file buffering unit are effectively used as shown in FIG. 4. During the readout latency and the time required for reading, the file B (another file) already held in the file buffering unit is pushed to the user terminal, and thereby a communication time is effectively used. The file B may be a file that is used by a number of user terminals, or may be a file the manager of the kiosk terminal wishes to preferentially distribute to users. In this manner, communications that effectively use the periods of time unnecessary for communications can be realized in the present embodiment.

Figure 5:
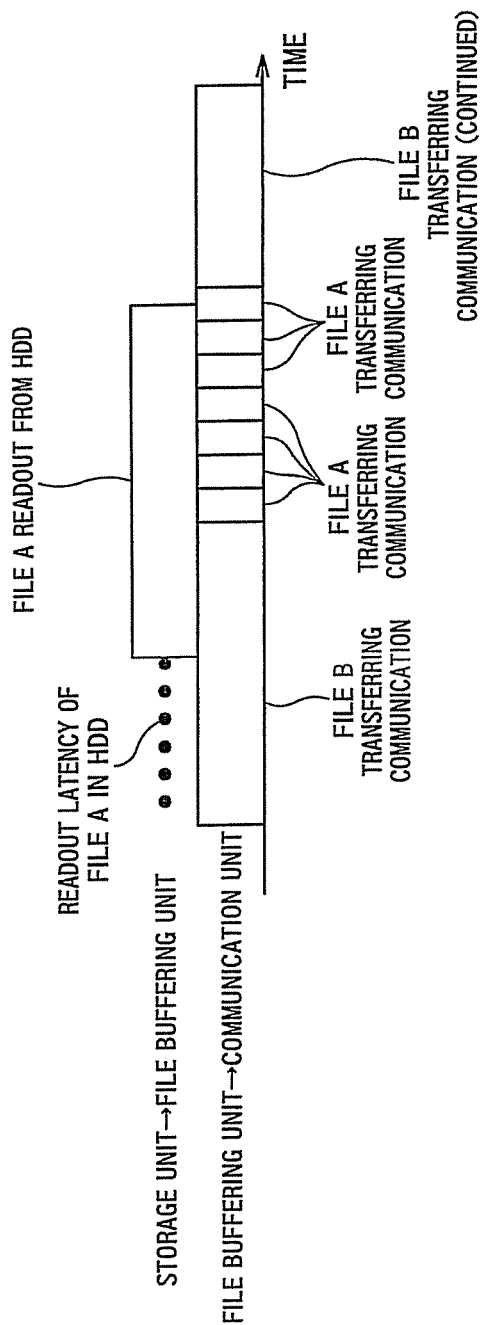
FIG. 5 is a diagram illustrating another example operation according to the present embodiment.

FIG. 5 illustrates another example operation according to the present embodiment.

In the example case illustrated in FIG. 5, the transfer of the file B is continued by using the period of time existing after the completion of the transfer of the file A. If a communicable state is maintained after the transfer of the file A requested by the user terminal is completed, and the transfer of the file B is not completed prior to the start of the transfer of the file A, the remaining data in the file B can be sent after the transfer of the file A. If a file C, a file D, and the like are held in the file buffering unit, those files may of course be transferred.

Figure 6:
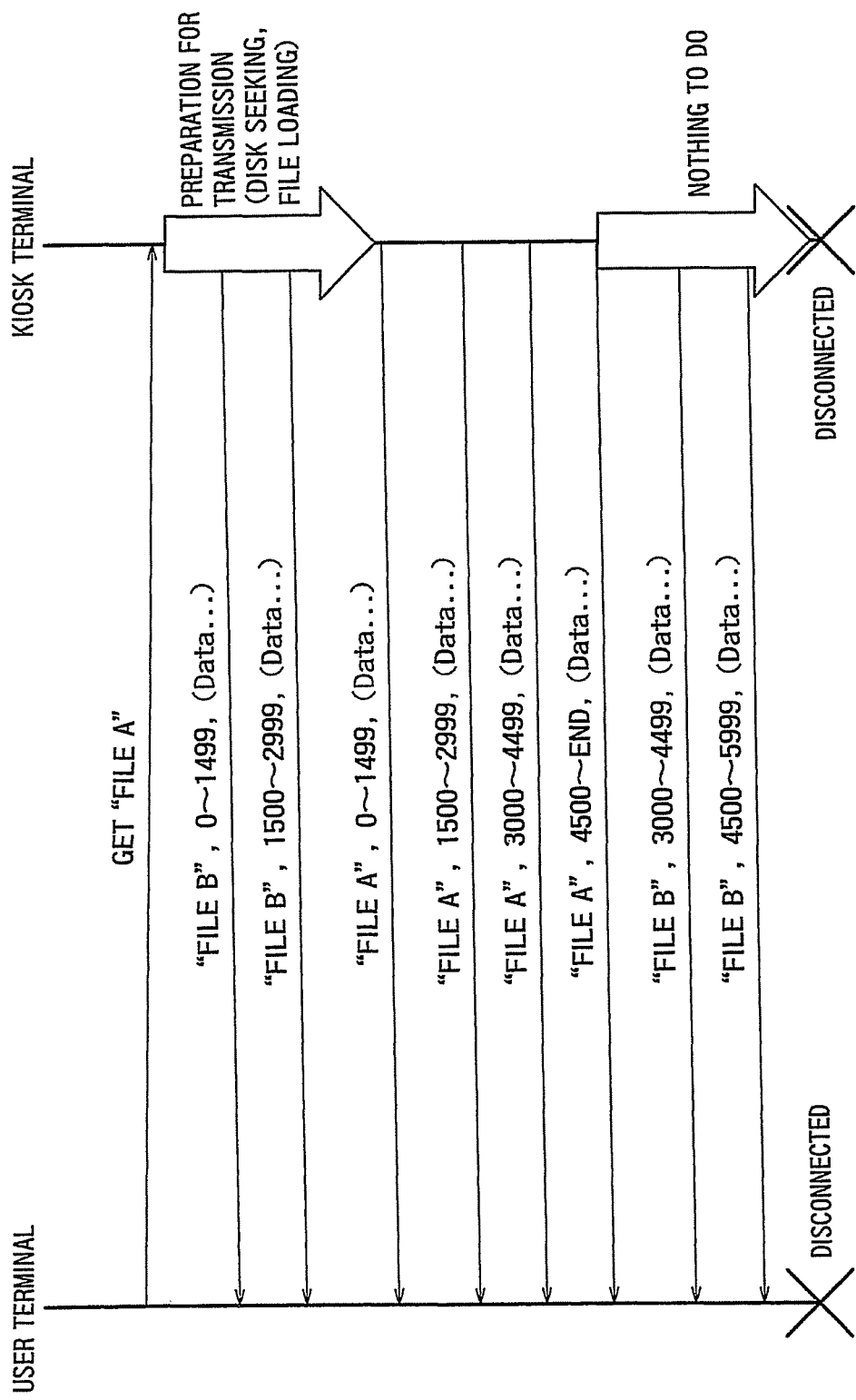
FIG. 6 is a diagram showing a communication sequence equivalent to the example operation illustrated in FIG. 5.

FIG. 6 shows a communication sequence equivalent to the example operation illustrated in FIG. 5.

An acquisition request for the file A (GET "file A") is received from a user terminal. In parallel to readout being performed as a preparation for the transfer of the file A from the storage unit, the file B held in the file buffering unit is transmitted. When the preparation for the transmission of the file A is made (described later in detail), the transmission of the file B is suspended, and the file A is transmitted. When the transmission of the file A is completed, the transmission of the file B is resumed. In this example, the touching state of the user terminal is canceled to cut off the communication prior to completion of the transmission of the file B, and the transfer of the file B is aborted.

FIGS. 7, 8, and 9 show examples of information to be exchanged between the respective functional blocks shown in FIG. 2.

FIG. 7 shows an example of the file transfer request information to be transmitted from the transfer protocol unit 23 to the push instructing unit 25 and the transferred file determining unit 26.

The file transfer request information contains the name of the file a user terminal has requested for a transfer, and the transfer starting position. The file transfer request information may also contain data length information indicative of how many bytes of data are to be transferred to the user terminal.

FIG. 8 shows an example of the transferred file information that is managed by the transfer protocol unit 23 and is to be sent to the push instructing unit 25.

The transferred file information contains information about the file transfer being performed with a user terminal via the communicating unit 24. Specifically, the transferred file information contains the information about the file that is actually being transferred (the name and size of the file), and the information about the size of the transferred data and the elapsed time indicating the current communication capacity, as well as the information about the file the user terminal has requested for a transfer (the name and size of the file).

FIG. 9 shows an example of the file cache status information that is managed by the file buffering unit 22, and is to be sent to the push instructing unit 25 and the transferred file determining unit 26.

The file cache status information indicates a list of caches of the files held in the file buffering unit 22. The file cache status information indicates which files have been read from the storage unit 21 into a memory and is held in the file buffering unit 22. For ease of explanation, cache sizes are shown in FIG. 9, on the assumption that caching is performed from the top of each file. However, depending on the implementation, caching can be started in the middle of a file, or can be performed in a file in a sporadic manner.

Figure 10:
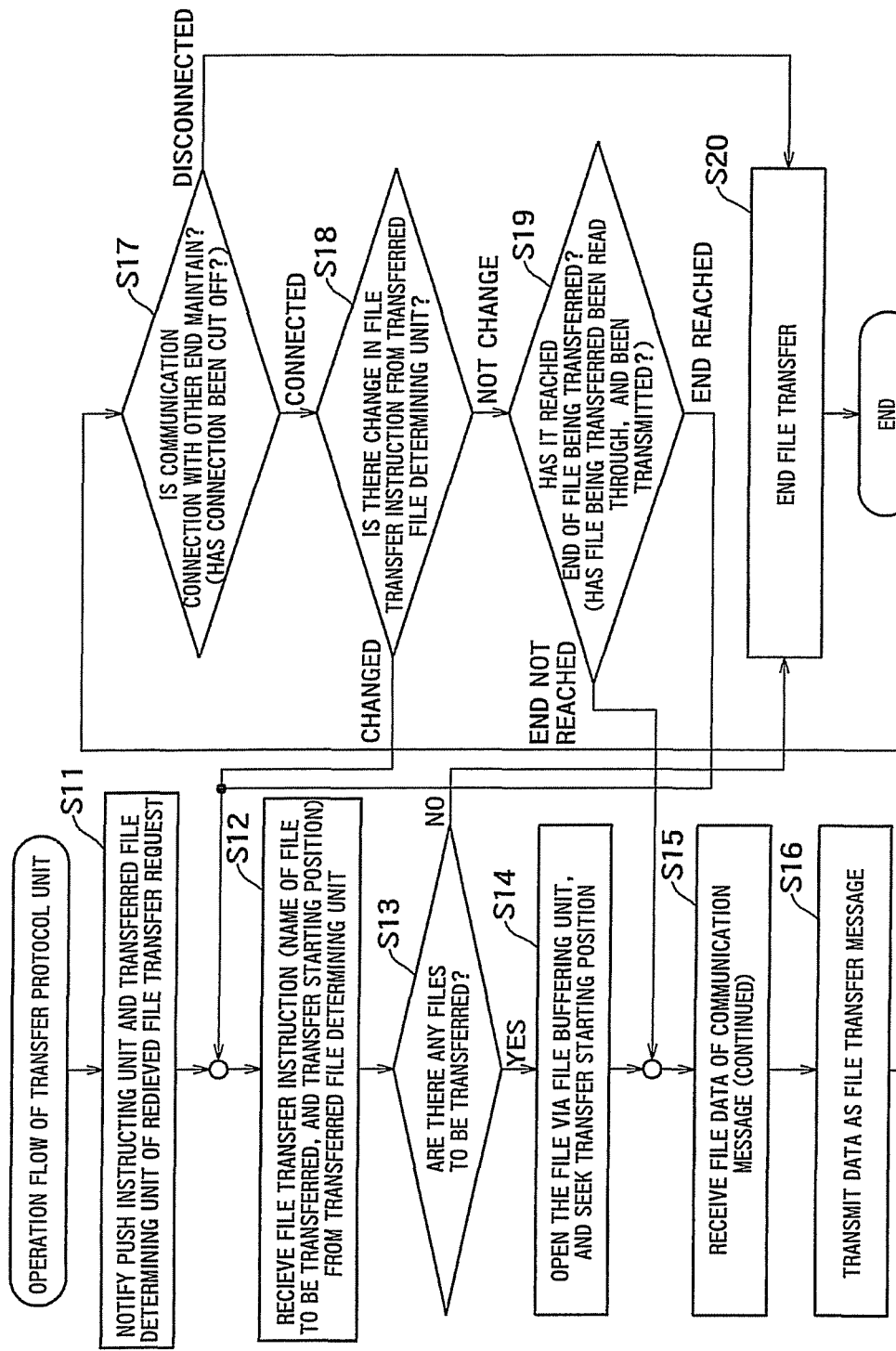
FIG. 10 is a flowchart showing an operation to be performed by the transfer protocol unit.

FIG. 10 is a flowchart showing an operation to be performed by the transfer protocol unit 23.

Upon receipt of a file transfer request from a user terminal via the communicating unit 24, the transfer protocol unit 23 notifies the push instructing unit 25 and the transferred file determining unit 26 of the file transfer request (S11). The transfer protocol unit 23 then receives a file transfer instruction containing the file name of the file to be actually transferred and the transfer starting position, from the transferred file determining unit 26 (S12).

When no file names are written in the file transfer instruction, the transfer protocol unit 23 determines that there is not a file to be transferred (S13), and ends the operation (S20).

When a file name is written in the file transfer instruction, the transfer protocol unit 23 transmits the data of the corresponding file to the user terminal, while reading sequentially the data from the file buffering unit 22 at a unit of the predetermined size, in accordance with a communication protocol (S14, S15, and S16). If the connection to the user terminal is cut off by a cancellation of the "touch" or the like during the transmission, the transfer protocol unit 23 ends the operation (S17 and S20).

If there is a change in the file transfer instruction from the transferred file determining unit 26, i.e., there is a change in the file to be transferred, the transfer protocol unit 23 immediately switches to a transfer of appropriate file data (S18 and S12).

If no instructions about a file to be transferred are sent from the transferred file determining unit 26 after the file transfer ends, i.e., a file transfer instruction containing no file names is sent after the file transfer ends, the transfer protocol unit 23 ends this operation (S19, S12, S13, and S20).

Figure 11:
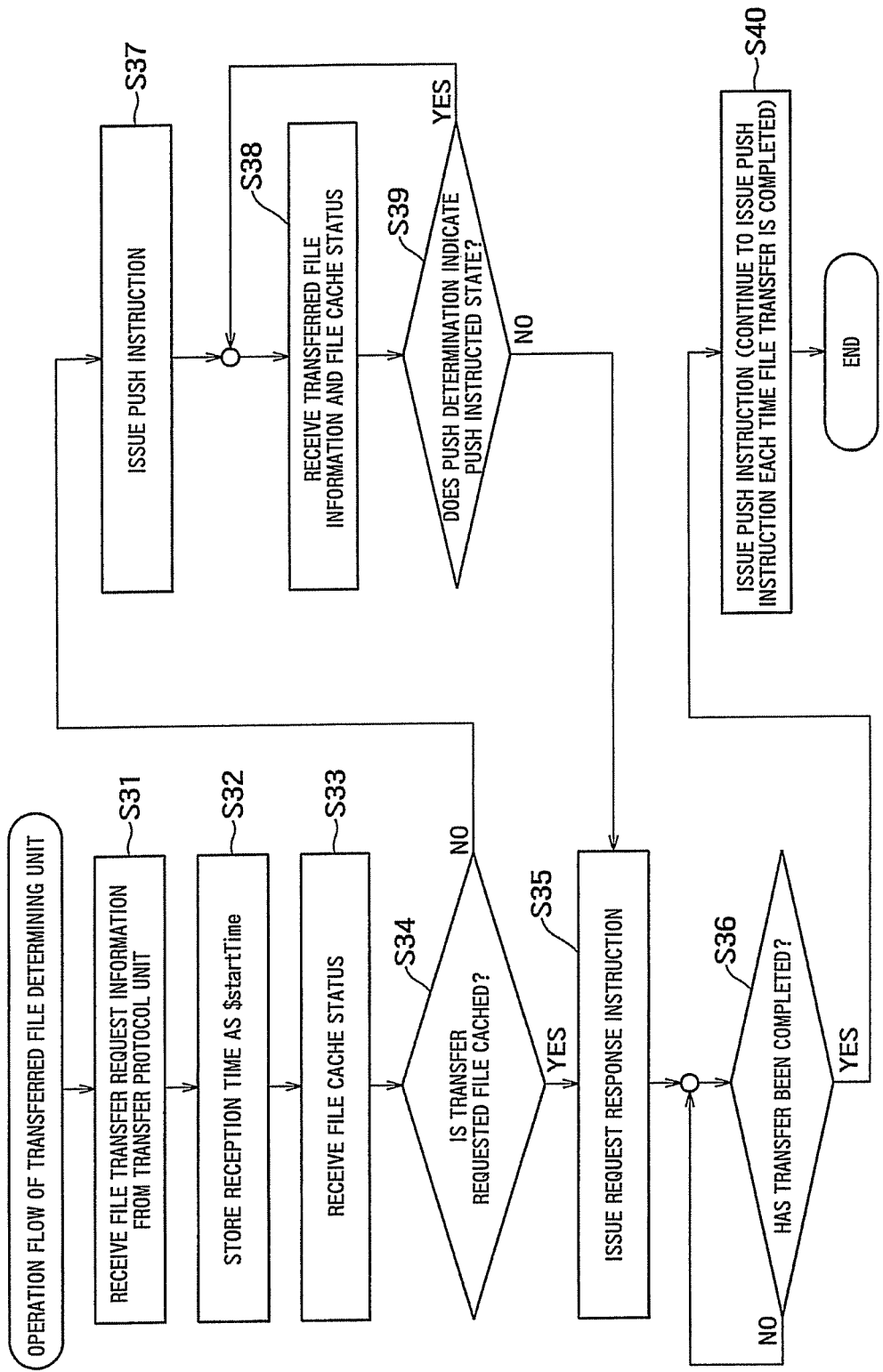
FIG. 11 is a flowchart showing an operation to be performed by the push instructing unit.

FIG. 11 is a flowchart showing an operation to be performed by the push instructing unit 25.

The push instructing unit 25 receives file transfer request information from the transfer protocol unit 23, and stores the reception time as $startTime (S31 and S32).

If the file (the file A) requested to be transferred is cached in the file buffering unit 22, the push instructing unit 25 issues a request response instruction to the transferred file determining unit 26 (S35). If the file is not cached, the push instructing unit 25 issues a push instruction to the transferred file determining unit 26.

Based on the transferred file information from the transfer protocol unit 23 and the file cache status from the file buffering unit 22, the push instructing unit 25 determines whether to issue a request response instruction, i.e., whether to transfer the requested file (the first file), at regular intervals (S38 and S39). That is, the push instructing unit 25 determines whether to cancel a push instruction and issue a request response instruction, or whether to keep the issued push instruction valid. The determination is performed in the following manner.

The time that is considered necessary for transferring the data already stored as a cache in the file buffering unit 22 via the transfer protocol unit 23 (a time required for transmitting cached data) is compared with the time required for storing the remaining uncached data as a cache (a remaining cache filling time).

FIG. 13 illustrates a method of calculating the remaining cache filling time and the time required for transmitting cached data.

The remaining cache filling time is determined by multiplying an elapsed time obtained by subtracting the above described reception time from the current time ((current time−$startTime) in FIG. 13), by a result obtained by dividing a value obtained by subtracting the cached file size from the size of the file A by the cached file size (($cFileSize[File A]−$cCacheSize[File A])/$cCacheSize[File A]) in FIG. 13).

For example, where the cached file size is exactly a half of the size of the file A, the result of the above division is 1, and therefore, the remaining cache filing time is calculated to be exactly the same as the above elapsed time.

Meanwhile, the time required for transmitting cached data is calculated by multiplying a result obtained by dividing the cached file size ($cCacheSize[File A]) by the size of the transferred data in the file being transferred ($tSendSize), by the elapsed transfer time for the file being transferred ($tSendTime). The "file being transferred" is a file (the file B, for example) that is being push-transferred during the readout of the file A, and is different from the file A. The speed of transmission of the file A is assumed to be the same as the speed of transmission of the file B.

If the remaining cache filling time is longer than the time required for transmitting cached data, the push instructing unit 25 determines not to issue a request response instruction yet (determines to keep the issued push instruction valid) (S37). If the remaining cache filling time becomes equal to or shorter than the time required for transmitting cached data, on the other hand, the push instructing unit 25 issues a request response instruction (S35).

When the transfer of the requested file is completed, the push instructing unit 25 again issues a push instruction (S40). The push instructing unit 25 continues to issue a push instruction every time a file transfer is completed.

As described above, waiting for moments that are least time-consuming, the push instructing unit 25 issues a push instruction and a request response instruction.

Figure 12:
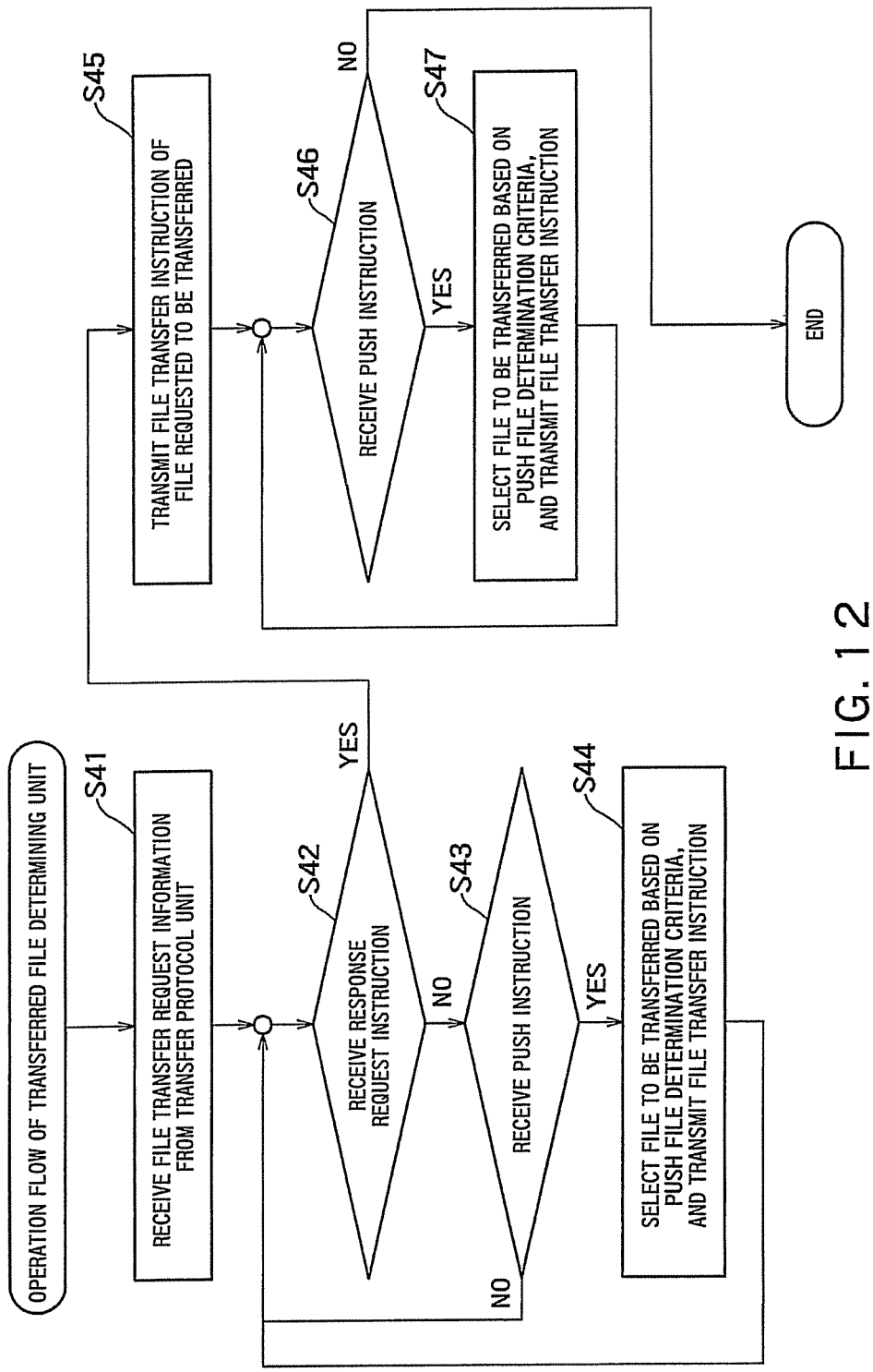
FIG. 12 is a flowchart showing an operation to be performed by the transferred file determining unit.

FIG. 12 is a flowchart showing an operation to be performed by the transferred file determining unit 26.

The transferred file determining unit 26 receives file transfer request information from the transfer protocol unit 23 (S41).

When receiving a push instruction from the push instructing unit 25, the transferred file determining unit 26 selects the file to be transferred to the user terminal, and issues a file transfer instruction to the transfer protocol unit 23 (S43 and S44).

The criteria for determining the file to be selected includes a method of sequentially selecting files, starting from the highest one in a file cache (see FIG. 9). Alternatively, a history of the past file pushes are stored, and files with more past pushes or fewer past pushes are preferentially selected.

In another example illustrated in FIG. 14, a candidate file to be pushed (a dependent file requested to be transferred) is presented in a file transfer request from a user terminal, and the file is selected in accordance with the presentation. Alternatively, as shown in FIG. 15, candidates (rejection files) not to be pushed for the reason that those files are already held in the user terminal (because selecting those files are pointless) are presented, and those files are avoided in the selecting process.

Upon receipt of a response request instruction from the push instructing unit 25, the transferred file determining unit 26 instructs the transfer protocol unit 23 to transfer the requested file (S42 and S45). After that, upon receipt of a push instruction from the push instructing unit 25, the transferred file determining unit 26 selects a file to be transferred based on the same criteria as above, and instructs the transfer protocol unit 23 to transfer the selected file (S47). If there is not a push instruction issued, the transferred file determining unit 26 ends the operation.

As described above, according to the present embodiment, another file is transferred during a period of time required for reading a subject file to be transferred from a storage, so that a limited communication time can be optimized for transferring files. That is, even in a case where only an extremely short period of communication time can be secured for transferring files through a high-speed communication path as in proximity wireless communication, file transfers that effectively use the limited period of time can be realized.

The file transfer device of the present embodiment may also be realized using a general-purpose computer device as basic hardware. That is, the function block of the file transfer block can be realized by causing a processor mounted in the above described computer device to execute a program. In this case, the file transfer device may be realized by installing the above described program in the computer device beforehand or may be realized by storing the program in a storage medium such as a CD-ROM or distributing the above described program over a network and installing this program in the computer device as appropriate. Furthermore, the storage unit of the file transfer device may also be realized using a memory device or hard disk incorporated in or externally added to the above described computer device or a storage medium such as CD-R, CD-RW, DVD-RAM, DVD-R as appropriate.

The invention claimed is:

1. A file transfer device comprising:
a file buffering unit configured to read a file from a storage storing files, and cache the file therein;
a receiving unit configured to receive a request for a transfer of a first file from a user terminal;
an instructing unit configured to instruct the file buffering unit to read the first file from the storage when the first file is not cached in the file buffering unit;
a determining unit configured to determine a second file which transfers to the user terminal from the file cached in the file buffering unit based on a file cache status of the file buffering unit when the first file is not cached in the file buffering unit;
a transfer protocol unit configured to read the second file from the file buffering unit while the file buffering unit reads the first file from the storage; and
a transmitting unit configured to transmit the second file read from the transfer protocol unit to the user terminal, wherein the instructing unit determines to transfer the first file, based on a progress status of reading the first file into the file buffering unit,
the transfer protocol unit suspends reading the second file from the file buffering unit and reads the first file from the file buffering unit, when the instructing unit determines to transfer the first file, and
the transmitting unit transmits the first file read by the transfer protocol unit to the user terminal.

2. The device according to claim 1, wherein the instructing unit determines the progress status of the reading of the first file, based on a time required for transmitting, among entire data of the first file, data cached in the file buffering unit to the user terminal, and a remaining cache filling time required for caching uncached data from the storage to the file buffering unit.

3. The device according to claim 2, wherein the instructing unit determines to transfer the first file when the remaining cache filling time becomes equal to or shorter than the time required for transmitting the data cached in the file buffering unit.

4. The device according to claim 1, wherein
the request for the transfer of the first file contains a designation of the second file, and the determining unit determines to transfer a file designated by the transfer request to the user terminal.

5. The device according to claim 1, wherein
the request for the transfer of the first file includes a list of rejection files, and
the determining unit determines a file different from the rejection files in the list, as the second file.

6. The device according to claim 1, wherein, after the transfer of the first file to the user terminal is completed, the transfer protocol unit resumes the reading of the second file.

7. A file transfer method comprising:
receiving a request for a transfer of a first file from a user terminal;
checking whether the first file is cached in a file buffering unit;
reading the first file from the storage and caching the first file in the file buffering unit when the first file is not cached in the file buffering unit;
determining a second file which transfers to the user terminal from the file cashed in the file buffering unit based on a file cache status of the file buffering unit when the first file is not cached in the file buffering unit;
reading the second file from the file buffering unit and transmitting the second file to the user terminal while the file buffering unit reads the first file;
determining to transfer the first file, based on a progress status of reading the first file into the file buffering unit;
suspending reading the second file and then reading the first file from the file buffering unit when it is determined to transfer the first file; and
transmitting the first file to the user terminal.

* * * * *